(12) United States Patent
Singatwaria (10) Patent No.: US 9,912,530 B2
(45) Date of Patent: *Mar. 6, 2018

(54) METHOD AND APPARATUS FOR HITLESS FAILOVER IN NETWORKING SYSTEMS USING SINGLE DATABASE

(71) Applicant: Juniper Networks, Inc., Sunnyvale, CA (US)

(72) Inventor: Sundeep Singatwaria, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 48 days.

This patent is subject to a terminal disclaimer.

(21) Appl. No.: 14/524,230

(22) Filed: Oct. 27, 2014

(65) Prior Publication Data

US 2015/0043327 A1  Feb. 12, 2015

Related U.S. Application Data

(63) Continuation of application No. 12/620,916, filed on Nov. 18, 2009, now Pat. No. 8,873,377.

(51) Int. Cl.
*H04L 1/22* (2006.01)
*H04L 12/24* (2006.01)
*G06F 11/20* (2006.01)
*H04J 3/14* (2006.01)

(52) U.S. Cl.
CPC ...... *H04L 41/0695* (2013.01); *G06F 11/2005* (2013.01); *H04J 3/14* (2013.01); *H04L 1/22* (2013.01); *H04L 41/0668* (2013.01); *H04L 41/0672* (2013.01); *H04L 41/12* (2013.01)

(58) Field of Classification Search
CPC .. H04L 12/40176; H04L 69/40; G06F 11/221; G06F 11/2002; G06F 11/2043; G06F 11/2046

See application file for complete search history.

(56) References Cited

U.S. PATENT DOCUMENTS

| | | | |
|---|---|---|---|
| 5,586,254 A * | 12/1996 | Kondo | H04L 41/0677 370/254 |
| 6,073,251 A | 6/2000 | Jewett et al. | |
| 6,717,913 B1 * | 4/2004 | Ghahremani | H04L 12/5695 370/230 |
| 7,171,589 B1 | 1/2007 | Urmanov et al. | |
| 7,221,912 B2 | 5/2007 | Nelson et al. | |
| 7,243,253 B1 | 7/2007 | McClary et al. | |

(Continued)

*Primary Examiner* — Benjamin Lamont
(74) *Attorney, Agent, or Firm* — Harrity & Harrity, LLP (57) ABSTRACT

A device includes a master control card that performs control plane processing, a backup control card, where the backup control card takes over control plane processing if the master control card goes out of service, and a database card that connects to the master control card and the backup control card, where the database control card stores information relating to control plane processing. A method of achieving hitless failover in a network element includes detecting that a master control card of the network element has gone out of service, designating the backup control card as a new master control card of the network element, establishing communication with a database card of the network element, and retrieving protocol states information from the database card.

20 Claims, 8 Drawing Sheets

(56) References Cited

U.S. PATENT DOCUMENTS

| | | | |
|---|---|---|---|
| 7,398,323 B1* | 7/2008 | Gerraty | H04L 41/0803 709/223 |
| 7,451,064 B2 | 11/2008 | Hodge et al. | |
| 7,483,370 B1 | 1/2009 | Dayal et al. | |
| 7,490,089 B1* | 2/2009 | Georgiev | G06F 11/203 |
| 7,804,770 B2 | 9/2010 | Ng | |
| 7,814,280 B2 | 10/2010 | Cummings et al. | |
| 8,351,429 B2 | 1/2013 | Assarpour | |
| 8,873,377 B2 | 10/2014 | Singatwaria | |
| 2002/0095496 A1 | 7/2002 | Antes et al. | |
| 2003/0218982 A1 | 11/2003 | Folkes et al. | |
| 2004/0078619 A1 | 4/2004 | Vasavada | |
| 2004/0199804 A1* | 10/2004 | Rathunde | G06F 11/0712 714/1 |
| 2005/0265346 A1* | 12/2005 | Ho | H04L 45/00 370/392 |
| 2005/0278520 A1 | 12/2005 | Hirai et al. | |
| 2006/0010338 A1* | 1/2006 | Schroiff | G06F 11/2023 714/6.3 |
| 2006/0047800 A1* | 3/2006 | Caveney | H04L 41/00 709/223 |
| 2006/0212453 A1* | 9/2006 | Eshel | G06F 11/2025 |
| 2006/0262784 A1 | 11/2006 | Cheethirala et al. | |
| 2007/0174658 A1* | 7/2007 | Takamoto | G06F 11/2028 714/4.11 |
| 2007/0201364 A1 | 8/2007 | Nakajima et al. | |
| 2008/0049622 A1* | 2/2008 | Previdi | H04L 12/2602 370/237 |
| 2008/0218987 A1 | 9/2008 | Lanus et al. | |
| 2009/0279549 A1 | 11/2009 | Ramanathan et al. | |
| 2010/0146592 A1* | 6/2010 | Gamare | G06F 11/2025 726/4 |
| 2010/0325370 A1 | 12/2010 | Cummings et al. | |
| 2010/0332776 A1* | 12/2010 | Uchikado | G06F 11/2064 711/162 |

\* cited by examiner

METHOD AND APPARATUS FOR HITLESS FAILOVER IN NETWORKING SYSTEMS USING SINGLE DATABASE

BACKGROUND

Networks typically include elements, such as routers, switches, or gateways, which transfer or switch data from one or more sources to one or more destinations. A packet is one format of data in which encapsulated data can be transmitted through a network. A network element, such as a router or a switch, may process packets. When the network element receives a packet at an input port, the network element may determine a destination and/or output port for the packet and/or determining whether to drop the packet or send the original or modified packet to another network element through an output port.

Components of the network element may malfunction or go out of service. In order to maintain functioning of the network element, the network element may contain a backup component, which may take over when a particular component of the network element malfunctions or goes out of service. However, particular components of the network element may process large amounts of data. For example, a network element may maintain a large list of destinations and may need to perform operations to periodically update a list of destinations. Therefore, if one of the particular components fails, a transition to a backup component may be complicated. Furthermore, assuring that the transition occurs without an interruption in the performance of the network element may tax the resources of the network element.

SUMMARY OF THE INVENTION

According to one aspect, a network element device may include a master control card that performs control plane processing; a backup control card, where the backup control card takes over control plane processing if the master control card goes out of service; and a database card that connects to the master control card and the backup control card, where the database control card stores information relating to control plane processing.

According to another aspect, a one rack unit network element may include a processor that performs control plane processing; a storage element that communicates with the processor, where the database control card stores information relating to control plane processing; and where the processor includes a reset line that, when the reset line is activated, the processor is reset and the storage element is not reset.

According to yet another aspect, a method of achieving hitless failover in a network element, performed by the network element, may include detecting, using a processor associated with a backup control card, that a master control card of the network element has gone out of service; designating, using the processor, the backup control card as a new master control card of the network element; establishing, using a communication interface of the backup control card, communication with a communication interface of a database card of the network element, the database card connecting to the master control card and the backup control card; and retrieving, using the communication interface of the backup control card, protocol state information from the database card.

According to yet another aspect, a network system may include first means for control plane processing; second means for control plane processing, where the second means for control plane processing is activated if the first means for control plane processing stops functioning; means for storing information associated with control plane processing, where the means for storing is remote from the first means and the second means; and where the first means and the second means communicate with the means for storing information to store information associated with control plane processing and retrieve information associated with control plane processing.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents.

A network element in a network may include multiple control cards. A control card may be chosen as a master control card of the system. The master control card may be responsible for processing information related to protocol state maintenance, timer maintenance, system health check, and/or other functions. A backup control card may be designated or elected using an algorithm in the network element to provide redundancy and hitless failover in case the master control card stops functioning. Hitless failover (also known as a graceful restart) may refer to continuous operation of the network element without significant loss of functionality or data.

All database states, such as states pertaining to protocols and timers that may be required for hitless failover, may be stored locally at each control card. Therefore, information pertaining to all database states may need to be continuously synchronized between the master control card and a backup control card so that the backup control card may become the new master control card in case the master control card fails. This synchronization may need to be performed for every state change that happens in the master control card, and a message may need to be sent to the backup control card every time a state change occurs. This synchronization may involve large amounts of software that may need to be written. Furthermore, the synchronization may unnecessarily tie up resources of the network element.

Implementations described herein may relate to separation of control plane processing and database maintenance processing in a control card of a network element. A database card may be provided that is separate (i.e. remote) from the master control card. The database card may maintain database data related to control plane processing performed by the master control card. The master control card may send messages to the database card to store updates to the database card, delete entries in the database card, and query the database card for required information. If the master control card fails, a backup control card may access the database information stored at the database card to maintain the function and assure hitless failover of the network element.

A master control card may fail for many reasons. A common cause of control card failure may be a fault in the program being executed by the control card. Another common cause of control card failure may be corruption of data. When data is stored locally on a control card, the data may be corrupted easier than when the data is stored on a separate database card. Furthermore, a control card may maintain relationships between the front elements (e.g. ports) of the network element, while a database card may only store data objects and provide the stored data objects to the control card. Since maintaining relationships may be more prone to failures of different kinds compared to storage of data objects, a database card may be less likely to fail.

Exemplary Network

Figure 1:
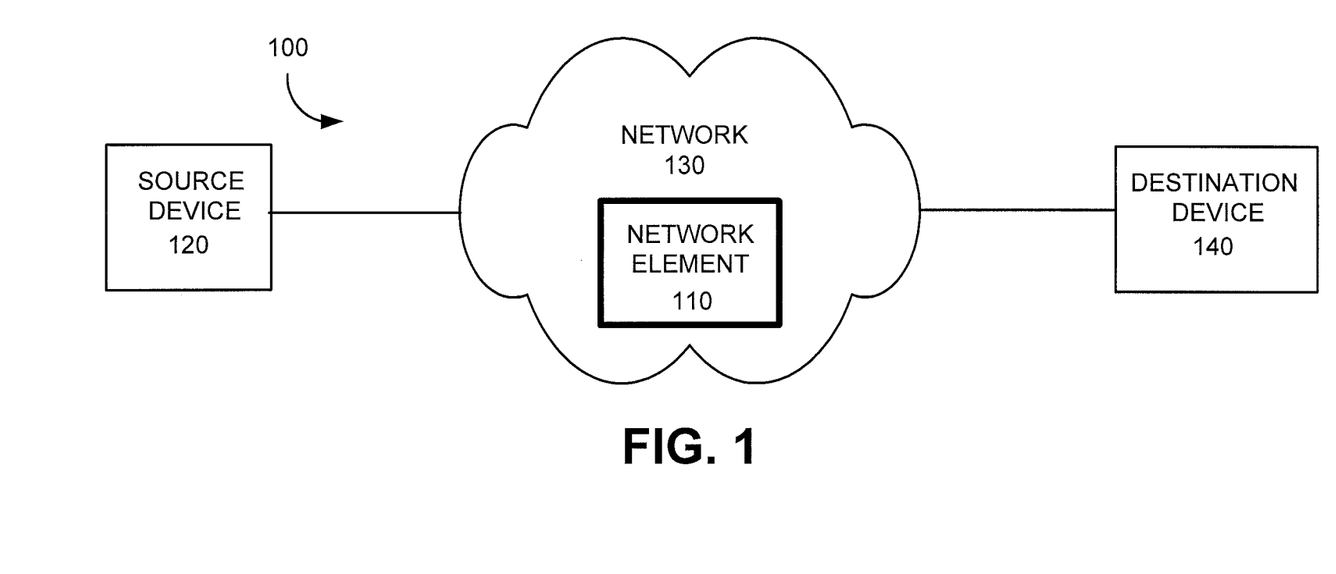
FIG. 1 is a diagram illustrating an exemplary network according to the implementations described herein.

FIG. 1 is a diagram illustrating an exemplary network system 100 according to implementations described herein. Network system 100 may be a packet-based network. The term "packet," as used herein, may refer to a packet, datagram, cell; a fragment of a packet, datagram or cell; or other types of data. For example, a packet may refer to an Internet Protocol (IP) packet that has been pre-pended with additional header fields (e.g., packet classification information, addresses, etc.). Network system 100 may include a network element 110, a source device 120, a network 130, and a destination device 140.

Network element 110 may include any device that receives and transmits packets within a network or between networks. Network element 110 may include, for example, a router, a switch, a bridge, a firewall, or a gateway. Network element 110 may include one or more ingress ports and one or more egress ports. Network element 110 may receive a packet at one of the ingress ports, determine a destination of the received packet, determine an egress port based on the determined destination, and forward the packet via the determined egress port. Additionally, network element 110 may determine whether to forward the received packet or whether to drop the received packet.

Source device 120 and destination device 140 may be a same type of device or different types of devices. For example, source device 120 and destination device 140 may include any device with a communication function, such as a personal computer or workstation, a server device, a portable communication device (e.g. a mobile phone), an access point base station, a cellular base station, or any type of network element encompassed by network element 110.

Network 130 may include one or more of a same type of packet-switched networks, or one or more packet-switched networks of different types. For example, network 130 may include one or more of a local area network (LAN), a wide area network (WAN), a metropolitan area network (MAN), a wireless network, such as a general packet radio service (GPRS) network, an ad hoc network, a public switched telephone network (PSTN), a subset of the Internet, any other network, or any combination thereof.

Although FIG. 1 shows exemplary components of network system 100, in other embodiments, network system 100 may include fewer, different, or additional components than depicted in FIG. 1. In still other embodiments, one or more components of network system 100 may perform the tasks described as being performed by one or more other components of network system 100.

Exemplary Network Element

Figure 2:
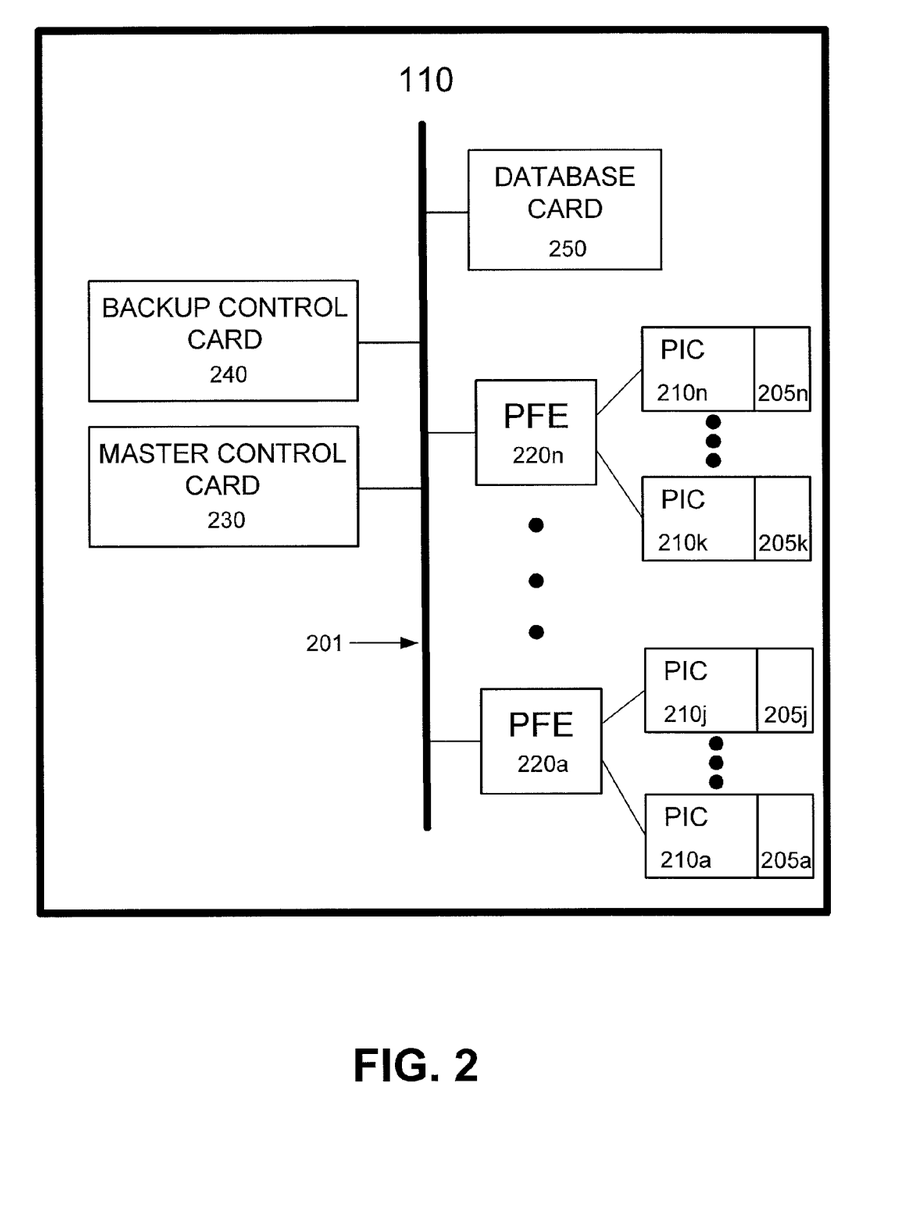
FIG. 2 is a diagram illustrating a network element according to implementations described herein.

FIG. 2 is a diagram illustrating exemplary components of network element 110 according to implementations described herein. Network element 110 may include a bus 201, physical interface cards 210a-210n, packet forwarding engines 220a-220n, a master control card 230, a backup control card 240, and a database card 250.

Bus 201 may permit communication among the components of network element 110.

Physical interface cards (PICs) 210a-210n may include ports 205a-205n. Ports 205a-205n may provide physical connections to other elements in a network and may receive and send packets. Each physical port may connect to one of many types of transport media, such as an optical fiber or Ethernet cable. A particular PIC and the associated port may be programmed and formatted according to one of several protocols, such as the synchronous optical network (SONET) standard, asynchronous transfer mode (ATM) technology, Ethernet, or Internet Protocol (IP).

PICs 210a-210n may be modular and replaceable elements, and may be hot-swappable, meaning that a particular PIC may be pulled out of its slot and replaced with a different PIC while network element 110 is operating, without interruption in the operation of network element 110.

PICs 210a-210n may perform basic data link layer functions, including communicating with another device using a data link layer protocol, such as Point-to-Point Protocol (PPP). PICs 210a-210n may perform basic operations on a particular incoming (or outgoing) packet, such as decapsulation and encapsulation, classifying a packet based on service class, internal redirection of packets to other components of network element 110, management of a flow table, and sampling of packets flows. PICs 210a-210n may be configured by a user for specific quality of service (QoS) requirements and may include a firewall.

Packet forwarding engines (PFEs) 220a-220n may include flexible port concentrators that include physical slots to hold one or more of PICs 210a-210n. Packet forwarding engines 220a-220n may implement forwarding plane processing. Forwarding plane processing may refer to processing of data packets on a per-packet basis. Packet forwarding engines 220a-220n may receive a data packet at a particular ingress port (via the associated PIC), look up the packet in a forwarding table to determine an egress port, and forward the packet to the determined egress port. Packet forwarding engines 220a-220n may also decrement a time-to-live (TTL) value of a packet when the packet is forwarded. If a packet forwarding engine cannot look up the destination of a particular packet in the forwarding table, if the packet has not been authenticated, if the packet is an exception packet (e.g. has a TTL of zero and has thus expired), or if the packet is a control packet, the packet forwarding engine will forward the packet to master control card 230 for processing.

Packet forwarding engines 220a-220n may additionally perform functions related to metering, shaping of flows, firewalls, network address translation, encapsulation and decapsulation (i.e. tunneling of flows), encryption and decryption, packet statistics, and accounting.

Master control card 230 may implement control plane processing. Control plane processing may relate to maintaining a routing table, manipulating forwarding tables, manipulating quality of service (QoS) tables, maintaining control protocols, keeping track of interface states, keeping track of types of cards present in network element 110, and any other functions performed within network element 110. The control plane (e.g., master control card 230) may maintain a shadow/cached copy of any tables that are stored in database card 250. The shadow/cached copy of the tables may allow for faster information processing compared to an implementation where information would need to be retrieved from database card 250 for every operation on the control plane.

Master control card 230 may determine a destination of any packet whose destination cannot be found in the forwarding table by consulting the routing table. Master control card 230 may determine whether to drop exception packets, such as packets with an expired TTL field. Additionally, master control 230 may send a message to source device 120, informing source device 120 that the expired packet did not reach its destination.

Master control card 230 may receive non-authenticated packets and attempt to authenticate the packets. For example, master control card 230 may receive a non-authenticated packet from one of packet forwarding engines 220a-220n, obtain the location of an authentication server (e.g. a RADIUS server) from database card 250, and contact the authentication server to authenticate the packet. If a non-authenticated packet is successfully authenticated, master control card 230 may provide the packet to one of packet forwarding engines 220a-220n for forwarding.

Master control card 230 may receive control packets. A control packet may be a packet that relates to a particular protocol, such as a layer 3 routing protocol. For example, a control packet may include information about a router that has gone out of service or is no longer reachable. In response, master control card 230 may update the routing table based on the information obtained from the control packet.

Master control card 230 may run multiple timers associated with control plane processing. For example, master control card 230 may receive a control packet associated with a particular protocol from a source device. The control packet may have an associated lifetime and master control card 230 may store the lifetime of the packet in database card 250 and initiate a timer to measure the lifetime of the packet. If master control card 230 does not receive another control packet from the source device, master control card 230 may designate the source device as being out of service.

Master control card 230 may send messages to database card 250 to query for required information when carrying out any of these functions. Master control card 230 may update database card 250 whenever a change occurs in any of the objects that are stored in database card 250 to store or delete entries on databases stored on database card 250.

Master control card 230 may include a console port. The console port may be a dedicated port for a user to interact with network element 110 via a command line interface. A user may connect an input and output device to the console port or may communicate with network element 110 via the console port over a network. The console port may allow a user to configure network element 110 and query network element 110 for status and configuration information.

Backup control card 240 may provide redundancy with respect to master control card 230. Backup control card 240 may, thus, have functionality identical to master control card 230, and if master control card 230 stops functioning, backup control card 240 may take over as the new master control card of network element 110. Activation of a backup control card may be through the generation of an interrupt signal to the backup control card when the master control card fails. For example, if master control card 230 fails or malfunctions, a signal may be sent to backup control card 240. Backup control card 240 may take over as the new master control card and may immediately establish communication with database card 250 and query database card 250 for information.

Backup control card 240 may also include a console port, which may allow a user to configure network element 110 and query network element 110 for status and configuration information.

Database card 250 may store information needed by master control card 230 to perform its functions, including all states pertaining to protocols, timers, and interfaces, information identifying the types of cards present in network element 110, as well as system state information. Master control card 230 may communicate with database card 250 to store and/or update information stored in a database or database card 250, and may read information from database card 250 when such information is required for control plane processing. If master control card 230 fails, backup control card 240 may read the stored information from database card 250.

Although FIG. 2 shows exemplary components of network element 110, in other embodiments, network element 110 may include fewer, different, or additional components than depicted in FIG. 2. In still other embodiments, one or more components of network element 110 may perform the tasks described as being performed by one or more other components of network element 110.

Exemplary Card Components

Figure 3A:
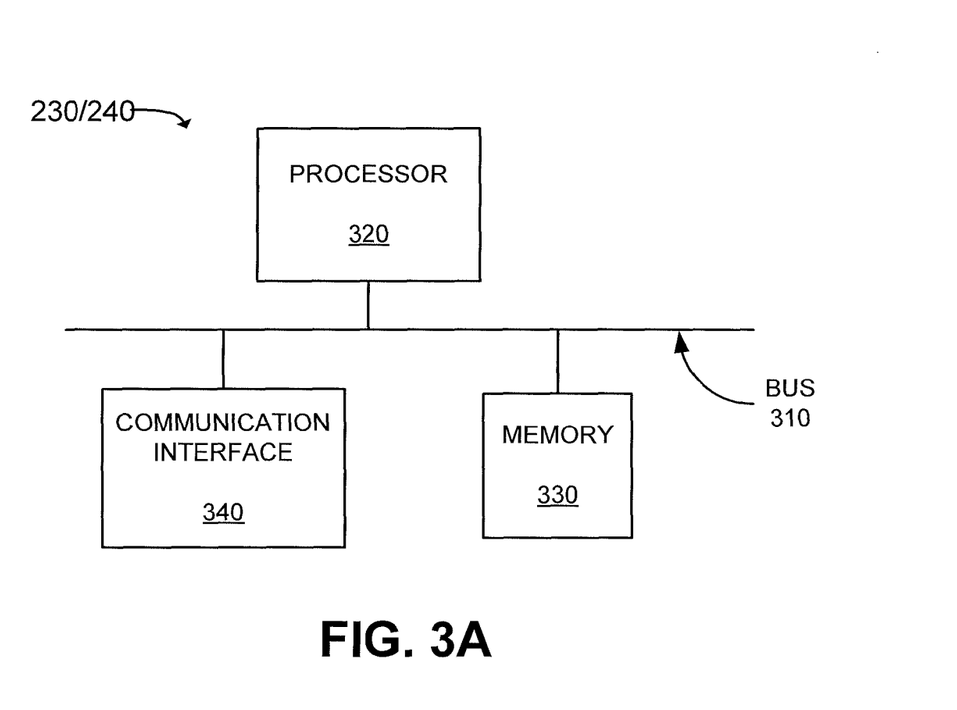
FIG. 3A is a diagram illustrating components of one of the control cards of the network element depicted in FIG. 2.

FIG. 3A is a diagram illustrating components of master control card 230 or backup control card 240 of network element 110. As illustrated, control card 230/240 may include a bus 310, a processor 320, a memory 330, and a communication interface 340.

Bus 310 may permit communication among the components of control card 230/240.

Processor 320 may include one or more processors, microprocessors, application specific integrated circuits (ASICs), field programmable gate arrays (FPGAs) or the like. Processor 320 may execute software instructions/programs or data structures to control operation of control card 230/240 and its components.

Memory 330 may include a random access memory (RAM) or another type of dynamic storage device that may store information and/or instructions for execution by processor 320; a read only memory (ROM) or another type of static storage device that may store static information and/or instructions for use by processor 320; a flash memory (e.g., an electrically erasable programmable read only memory (EEPROM)) device for storing information and/or instructions; and/or some other type of magnetic or optical recording medium and its corresponding drive. Memory 330 may also be used to store temporary variables or other intermediate information during execution of instructions by processor 320. Instructions used by processor 320 may also, or alternatively, be stored in another type of computer-readable medium accessible by processor 320. A computer-readable medium may be defined as a physical or logical memory device. A logical memory device may include memory space within a single physical memory device or spread across multiple physical memory devices.

Communication interface 340 may include any communication mechanism that allows card 300 to communicate with another card or another component of a network element or another element across a network. For example, communication interface 340 may include an Ethernet interface.

Although FIG. 3A shows exemplary components of control card 230/240, in other embodiments, control card 230/240 may include fewer, different, or additional components than depicted in FIG. 3A. In still other embodiments, one or more components of control card 230/240 may perform the tasks described as being performed by one or more other components of control card 230/240.

Figure 3B:
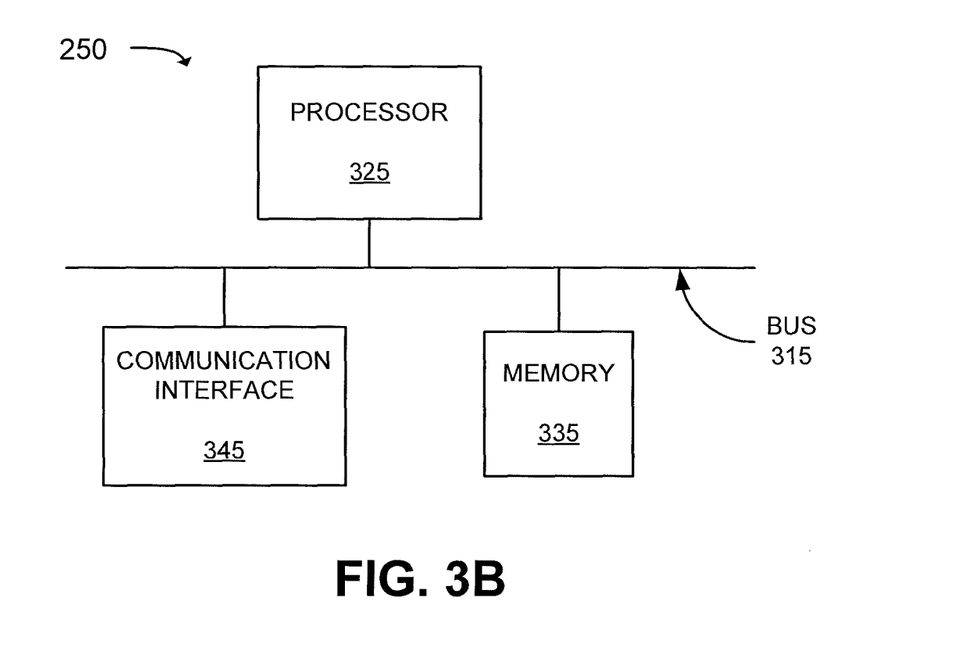
FIG. 3B is a diagram illustrating components of a database card of the network element depicted in FIG. 2.

FIG. 3B is a diagram illustrating components of database card 250 of network element 110. As illustrated, database card 250 may include a bus 315, a processor 325, a memory 335, and a communication interface 345.

Bus 315 may permit communication among the components of database card 250.

Processor 325 may include one or more processors, microprocessors, application specific integrated circuits (ASICs), field programmable gate arrays (FPGAs) or the like. Processor 325 may execute software instructions/programs or data structures to control operation of database card 250 and its components.

Memory 335 may include a random access memory (RAM) or another type of dynamic storage device that may store information and/or instructions for execution by processor 325; a read only memory (ROM) or another type of static storage device that may store static information and/or instructions for use by processor 325; a flash memory (e.g., an electrically erasable programmable read only memory (EEPROM)) device for storing information and/or instructions; and/or some other type of magnetic or optical recording medium and its corresponding drive. Memory 335 may also be used to store temporary variables or other intermediate information during execution of instructions by processor 325. Instructions used by processor 325 may also, or alternatively, be stored in another type of computer-readable medium accessible by processor 325. A computer-readable medium may be defined as a physical or logical memory device. A logical memory device may include memory space within a single physical memory device or spread across multiple physical memory devices.

Communication interface 345 may include any communication mechanism that allows database card 250 to communicate with another card or another component of a network element or another element across a network. For example, communication interface 345 may include an Ethernet interface.

Although FIG. 3B shows exemplary components of database card 250, in other embodiments, database card 250 may include fewer, different, or additional components than depicted in FIG. 3B. In still other embodiments, one or more components of database card 250 may perform the tasks described as being performed by one or more other components of database card 250.

Exemplary Database Card

Figure 4:
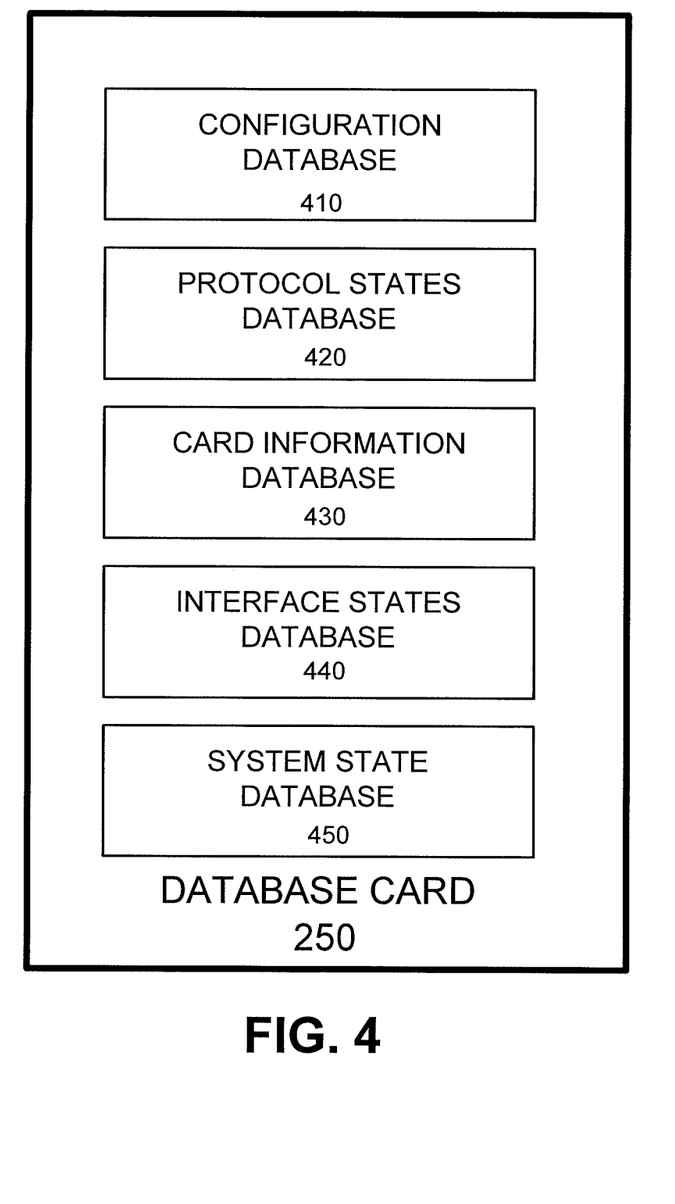
FIG. 4 is a diagram illustrating an exemplary database card according to implementations described herein.

FIG. 4 is a diagram illustrating exemplary databases that may be stored on database card 250 according to implementations described herein. As illustrated, database card 250 may include a configuration database 410, a protocol states database 420, a card information database 430, an interface states database 440, and a system state database 450. Databases 410-450 may be implemented, for example, in memory 335 of database card 250. The databases illustrated in FIG. 4 are exemplary. In practice, database card 250 may include fewer, additional, or other types of databases. Therefore, FIG. 4 should not be construed as limiting the type of information that can be stored and/or managed by database card 250. Database card 250 may store and/or manage any information required by master control card 230 or backup control card 240. Databases 410-450 may, for example, take the form of multiple lookup tables.

Configuration database 410 may store configuration parameters associated with network element 110 that may have been set by a user. Configuration database 410 may also store a default configuration for network element 110. The configuration parameters may include, for example, the protocols that are enabled on ports 205a-205n, virtual local area networks (VLANs) that may have been configured on particular ports, quality of service (QoS) parameters that may have been configured on particular ports, firewall filters that may have been configured on particular ports, layer 1, layer 2, or layer 3 configuration parameters associated with a particular port, and/or other types of parameters.

In one implementation, configuration database 410 may also store the location of an authentication server. For example, configuration database 410 may store the IP address of a Remote Authentication Dial In User Service (RADIUS) server.

Protocol states database 420 may store information related to protocols implemented by network element 110. Examples of protocols implemented by network element 110 may include distance vector routing protocols, such as Routing Information Protocol (RIP); link-state routing protocols, such as Open Shortest Path First (OSPF) protocol or Intermediate System to Intermediate System (IS-IS) protocol; data carrying protocols, such as Multiprotocol Label Switching (MPLS); or multicast protocols, such as User Datagram Protocol (UDP), Pragmatic General Multicast (PGM), or Protocol Independent Multicast (PIM). Protocol state information may include network topology information about the network, including which network elements are neighbors of network element 110 as well as protocol states associated with the neighbors. Thus, protocol states database 420 may comprise routing tables used by network element 110.

Protocol states database 420 may also store information associated with various timers that are associated with various network protocols (e.g. layer 2 or layer 3 protocols) being run by master control card 420. For example, protocol states database 420 may store information associated with a particular timer, such as the lifetime of a particular control packet.

Card information database 430 may store information about PICs 210a-210n present in network element 110, such as what kind of card a particular PIC is and what kind of interface a particular PIC terminates. A PIC may terminate, for example, a twisted pair copper line supporting voice Plain Old Telephone Service (POTS) service, an Integrated Services Digital Network (ISDN) service, a Digital Subscriber Loop (DSL) service, a Very High Bitrate DSL (VDSL) service, or Ethernet over twisted pair service; a coaxial line communicating with cable modems; a fiberoptic line operating according to the Synchronous Optical Networking (SONET) standard; or a wireless access point connected to a wireless network, such as a General Packet Radio Service (GPRS) network.

Interface states database 440 may store information about the status of particular interfaces (i.e. a particular port and the associated PIC) of network element 110. The information may include whether an interface is up or down (i.e. whether the interface is in operation). Interface states database 440 may also store statistics associated with ports 205a-205n, such as the number and types of packets received during a particular period of time.

System state database 450 may store information pertaining to the environment of network element 110. Examples of system state information may include the temperature of network element 110, as well as temperatures of particular cards present in network element 110. For example, system state database 450 may store the temperatures of PICs 210a-210n, packet forwarding engines 220a-220n, master control card 230, backup control card 240, and database card 250. System state database 450 may also store information about air flow within network element 110 and the status of cooling devices with network element 110, such as fans or Peltier junctions.

Although FIG. 4 shows exemplary components of database card 250, in other embodiments, database card 250 may include fewer, different, or additional components than depicted in FIG. 4. In still other embodiments, one or more components of database card 250 may store information described as being stored by one or more other components of database card 250.

Exemplary Processes

A control card may communicate with a database card using a set of commands. An exemplary set of commands may include a GET command to retrieve information from the database card, a DELETE command to delete information from the database card, an UPDATE command to update information in the database card, a COMMIT command to commit information that has been updated, and a ROLLBACK command to prevent information that has been updated from being committed to the database card. Thus, storing information in a database card may be a two step process, where the first step may be updating the information to a database, while the second step may be committing the information to the database.

A control card, such as master control card 230, may write information to configuration database 410, for example, when a user changes the configuration of network element 110 via a console port. For example, a user may configure a new VLAN on one of ports 205a-205n of network element 110. Master control card 230 may read information from configuration database 410, for example, when master control card 230 receives a packet for a particular VLAN, to determine whether a given port belongs to the particular VLAN.

A control card, such as master control card 230, may write information to protocol states database 420, for example, when master control card 230 receives a control packet with information about the topology of the network, such as that a neighbor network element went out of service or an advertisement packet that advertises a new route in the network. Master control card 230 may read information from protocol states database 420, for example, when master control card 230 receives a control packet that includes new link-state information, such as an advertisement packet that advertises a new route. Master control card 230 may read information from protocol states database 420 so that master control card 230 may re-compute a shortest path tree to a particular destination based on the new information. Master control card 230 may then update forwarding tables stored in packet forwarding engines 220a-220n.

A control card, such as master control card 230, may write information to card information database 430, for example, when a user removes or replaces a card (e.g. one of PICs 210a-210n). Master control card 230 may read information from card information database 430, for example, if a user enters a command to show the hardware present in network element 110. For example, a user may enter such a command via a console port.

A control card, such as master control card 230, may write information to interface states database 440, for example, when one of ports 205a-205n goes out of service. Master control card 230 may read information from card interface states database 440, for example, if a user enters a command to show the status of the interfaces (i.e., ports 205a-205n) present in network element 110. For example, a user may enter such a command via a console port.

A control card, such as master control card 230, may write information to system state database 450, for example, if the temperature on a particular card rises. Master control card 230 may read information from system state database 450, for example, if a user enters a command to show results of the latest system health check. For example, a user may enter such a command via a console port.

Figure 5:
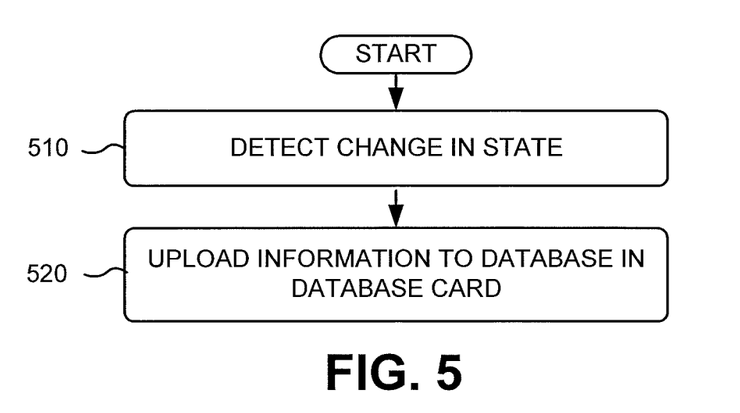
FIG. 5 is a flow chart illustrating a process of providing information to a database card.

FIG. 5 is a flow chart illustrating a process of providing information to a database card, such as database card 250, by a control card, such as master control card 230. In one implementation, the process illustrated in FIG. 5 may be performed by one or more components of network element 110. In other implementations, the process illustrated in FIG. 5 may be performed by another device or group of devices.

Processing may begin by detecting a change in a state of a network component, such as network component 110 (block 510). For example, master control card 230 may receive a command from a user to reconfigure a port; receive a control packet from another network element indicating that a particular network element is no longer available; detect a change in the topology of the network; detect that a particular PIC has been removed or replaced with a different PIC, or has gone out of service; detect that a particular interface (i.e. a port) has gone out of service or has gone back into service; or detect that the temperature of the environment has changed. A command to reconfigure a particular port may include a command to change at least one of a protocol enabled on the particular port, a VLAN associated with the particular port, a quality of service requirement associated with the particular port, or a firewall associated with the particular port.

Information may be uploaded to a database in database card 250 (block 520). For example, processor 230 of master control card 230 may send an UPDATE signal to communication interface 345 of database card 250. The UPDATE signal may include information about which database in database card 250 will be accessed, as well as which record in the particular database will be changed. In response, processor 325 of database card 250 may lock the particular record, to prevent another component of network element 110 from manipulating the particular record.

Processor 230 of master control card 230 may then perform one or more of the following exemplary acts. Processor 230 may send a COMMIT command to configuration database 410 to update configuration information; send a COMMIT command to protocol states database 420 to remove a network element from a routing table or store a recomputed route; send a COMMIT command to card information database 430 to indicate a PIC has been replaced; send a COMMIT command to interface states database 440 to indicate a particular port has gone out of service; or send a COMMIT command to system state database 450 with a new temperature reading.

Figure 6:
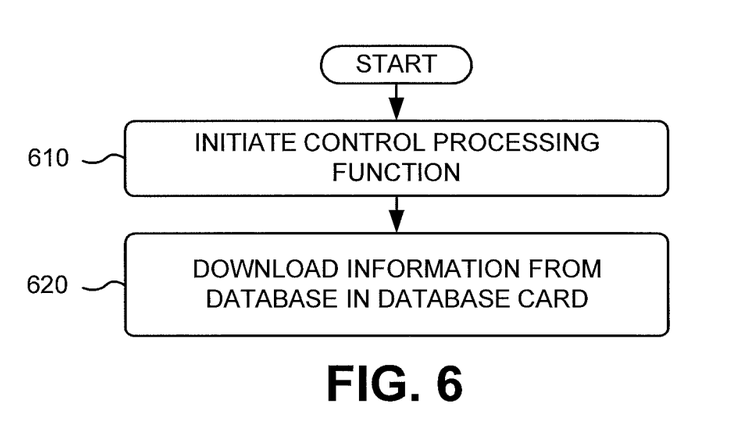
FIG. 6 is a flow chart illustrating a process of receiving information from a database card.

FIG. 6 is a flow chart illustrating a process of receiving information from a database card, such as database card 250. In one implementation, the process illustrated in FIG. 6 may be performed by one or more components of network element 110. In other implementations, the process illustrated in FIG. 6 may be performed by another device or group of devices.

Processing may begin by initiating a control processing function (block 610). For example, master control card 230 may receive a packet for a particular VLAN or with particular quality of service requirements; may be in the process of updating a routing table; may receive a packet from a packet forwarding engine when the packet forwarding engine could not determine the destination of the packet from the forwarding table; may receive a non-authenticated packet from a packet forwarding engine; may receive a command from a user via a console port querying for configuration, card, interface, or system health information; and/or may be performing another function that requires information from database card 250.

Information may be downloaded from a database in database card 250 (block 620). For example, communication interface 340 of master control card 230 may send a signal to communication interface 345 of database card 250. The signal may include information about which database in database card 250 will be accessed, as well as which record in the particular database will be read. In response, processor 325 of database card 250 may lock the particular record, to prevent another component of network element 110 from manipulating the particular record.

For example, processor 320 of master control card 230 may perform one or more of the following exemplary acts. Processor 320 may send a GET request to configuration database 410 to check whether a particular port belongs to a particular VLAN; may send a GET request to configuration database 410 for the IP address of the RADIUS server; may send a GET command to protocol states database during the process of computing a new route; or may send a GET command to any of configuration database 410, card information database 430, interface states database 440, or system state database 450 for information to be provided to a user via a console port. In response to receiving the GET command, database card 250 may retrieve the appropriate information and send the information to master control card 230.

Figure 7:
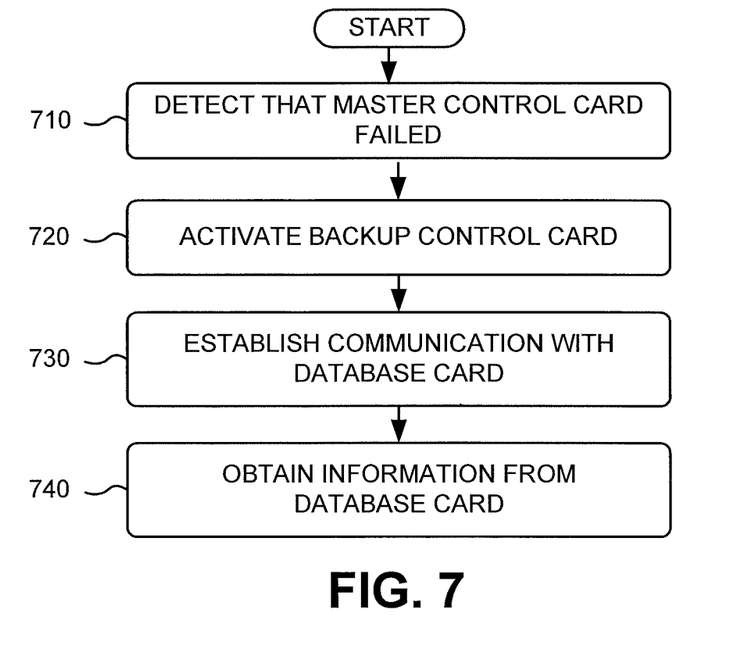
FIG. 7 is a flow chart illustrating a process for transferring control from a master control card to a backup control card.

FIG. 7 is a flow chart illustrating a process of transferring control from a master control card, such as master control card 230, to a backup control card, such as backup control card 240. In one implementation, the process illustrated in FIG. 6 may be performed by one or more components of network element 110. In other implementations, the process illustrated in FIG. 6 may be performed by another device or group of devices.

Master control card 230 may stop functioning. Processing may begin by detecting that a master control card failed (block 710). For example, master control card 230 may generate an interrupt. In one implementation, master control card 230 may implement a dedicated interrupt line that may be activated by a software crash. In another implementation, master control card 230 may periodically send a heart-beat signal to an error detection routine, and if the heart-beat signal is not received within a particular time period, the error detection routine may generate the interrupt. In yet another implementation, the error detection routine may periodically poll a particular memory location. Programs running on master control card 230 may write to the particular memory location if a severe enough error occurs, and the error detection routine may generate the interrupt based on detecting that the particular memory location haw been overwritten.

In one implementation, in response to the hardware interrupt, network element 110 may reset. When network element 110 is reset, database card 250 may not be reset along with the system. Therefore, database card 250 may not lose any data and thus network element 110 may achieve a hitless failover. In another implementation, the hardware interrupt may not cause network element 110 to reset.

A backup control card may be activated (block 720). For example, backup control card 240 may become the new master control card of network element 110. Both master control card 230 and backup control card 240 may include a boot monitor program that may initiate operation. The boot monitor program may include instructions to give preference to master control card 230. After a reset, or after detecting an interrupt signal, if the boot monitor program of backup control card 240 does not detect master control card 230 coming into operation within a particular period of time (e.g. within 5 seconds), the boot monitor program of backup control card 240 may instruct backup control card 240 to become the master of the system and take over control plane processing of network element 110.

Once a backup control card becomes the new master control card of the system, the backup control card may need to access database card 250 to perform operations for network element 110. For example, the new master control card may need information pertaining to various timers associated with layer 2 and layer 3 protocols running on network element 110.

Communication with a database card, such as database card 250, may be established (block 730). For example, communication interface 340 of backup control card 240 may send a GET signal to communication interface 340 of database card 250. The signal may include information about which database(s) in database card 250 will be accessed, as well as which record(s) in the particular database will be read. In response, processor 320 of database card 250 may lock the particular record(s), to prevent another component of network element 110 from manipulating the particular record.

Information from database card 250 may be obtained (block 740). For example, backup control card 240 may download information associated with protocol states from protocol states database 250, such as information associated with lifetimes of control packets.

Exemplary Implementations of Database Card

Figure 8:
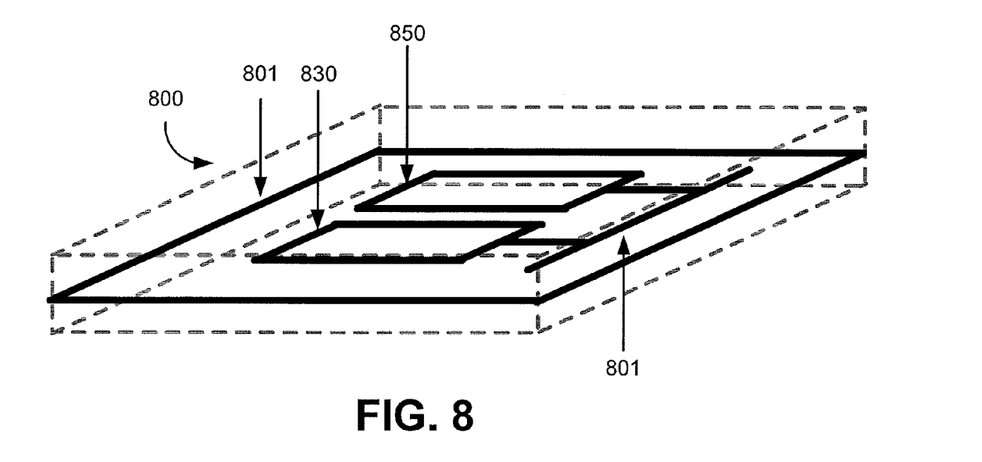
FIG. 8 is a diagram of a database card implemented in an exemplary one rack unit network element.

FIG. 8 is a diagram of an exemplary one rack unit (1-RU) network element, also known as a pizza networking system.

1-RU network element 800 may include a single board 801. Board 801 may include bus 801, a control processor 830, and a storage element 850. Bus 801 may permit communication among the components of 1-RU network element 800. Control processor 830 may perform functions similar to the functions performed by master control card 230. For example, control processor 830 may perform functions related to control plane processing. Storage element 850 may perform functions similar to the functions performed by database card 250. For example, storage element 850 may include databases 410-450. Board 801 may include additional components, such as one or more packet forwarding engines that perform forward plane processing, and one or more physical interfaces and associated ports for receiving and sending packets (not shown).

A 1-RU network element may not include any backup components to take over if control processor 830 fails. Therefore, if control processor 830 stops functioning, 1-RU network element 800 may need to be reset. 1-RU network element 800 may reset for other reasons, such due to a power outage, or when a user resets 1-RU network element 800. If the system resets, the system may start back up with no prior knowledge about its past state. This may cause instability until protocols running on 1-RU network element 800 converge. To provide hitless failover, a 1-RU network element may be mirrored to another 1-RU network element, which may not be cost effective and may require continuous updating of the mirrored system.

Control processor 830 may include a reset line that resets control processor 830. The reset line of control processor 830 may drive other components of board 800 to reset as well. However, the reset line may not be connected to storage element 850, and therefore storage element 850 may not be connected to the reset line. Therefore, when 1-RU network element 800 is reset, storage element 850 may not be restarted and may retain information pertaining to control plane processing of 1-RU network element 800. When central processor 830 comes back online, central processor 830 may access storage element 850 and may download information required for control plane processing, without having to re-establish protocol states. Therefore, when storage element 850 is incorporated into 1-RU network element 800 and is not connected to a reset line, storage element 850 may provide hitless failover for 1-RU network element 800.

Although FIG. 8 shows exemplary components of 1-RU network element 800, in other embodiments, 1-RU network element 800 may include fewer, different, or additional components than depicted in FIG. 8. In still other embodiments, one or more components of 1-RU network element 800 may perform the tasks described as being performed by one or more other components of 1-RU network element 800.

Figure 9:
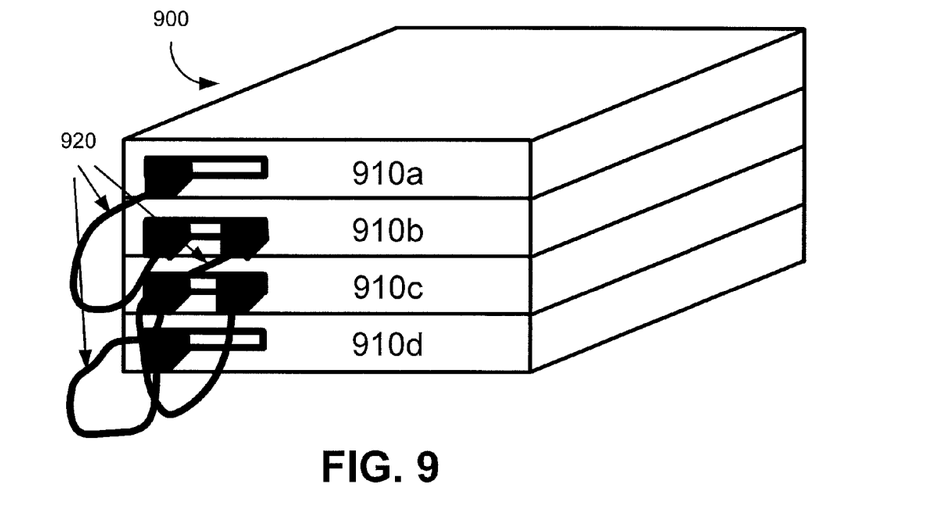
FIG. 9 is a diagram of a database card implemented in an exemplary stacked system network element.

FIG. 9 is a diagram of a database card implemented in an exemplary stacked system network element. A stacked system network element 900 may include stacked elements 910a-910d connected via cables 920. Therefore, a stacked system may be one without a chassis and/or backplane. In a stacked system that does not include a database card, an element of the stack that includes a master control card, which stores state information locally, may need to continuously synchronize the stored state information with an element of the stack that includes a backup control card. This may increase the load on links that are already shared for inter-card communication and traffic redirection between elements of the stacked system.

This may be avoided by including a database card as an element of the stack and connecting the database card to all the elements of the stack. Thus, stacked elements 910a-910d may include components of network element 110. For example, stacked element 910a may include one or more packet forwarding engines and one or more physical interface cards, such as PFEs 220a-220n and PICs 210a-210n; stacked element 910b may include a master control card, such as master control card 230; stacked element 910c may include a backup control card, such as control card 240; and stacked element 910d may include a database card, such as database card 250.

Thus, stacked element 910b may act as a master of the system that populates databases of stacked element 910d. If stacked element 910b fails, stacked element 910c, which may include a backup control card, takes over control plane processing and may assure hitless recovery. This setup may require less software to implement than a stacked system without a database card, where state information is stored locally, and may eliminate the need for continuous updates between a master control card and a backup control card.

Although FIG. 9 shows exemplary components of stacked system network element 900, in other embodiments, stacked system network element 900 may include fewer, different, or additional components than depicted in FIG. 9. In still other embodiments, one or more components of stacked system network element 900 may perform the tasks described as being performed by one or more other components of stacked system network element 900.

Figure 10:
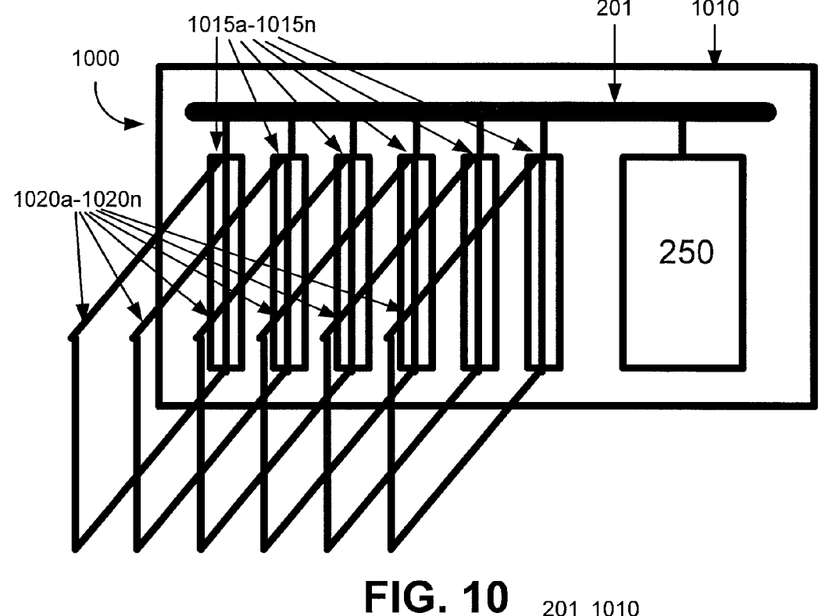
FIG. 10 is a diagram of a first exemplary implementation of a database card implemented in an exemplary chassis network element.

FIG. 10 is a diagram of a first exemplary implementation of a database card implemented in an exemplary chassis network element. In a chassis system, cards may be connected to a backplane via slots. In the first exemplary implementation illustrated in FIG. 10, a database card may be part of the backplane.

A chassis network element 1000 may include a backplane 1010. Backplane 1010 may include physical slots 1015a-1015n, bus 201, and database card 250. Bus 201 may permit communication between cards connected to physical slots 1015a-1015n and database card 250. Physical slots 1010a-1015n may hold cards 1020a-1020n.

Cards 1020a-1020n may include components of network element 110. As an example, card 1020a may include PIC 210a, card 1020b may include PIC 210b, card 1020c may include packet forwarding engine 220a, card 1020d may include master control card 230, and card 1020e may include backup control card 240. Cards 1020a-1020n may include any number of PICs and packet forwarding engines. Card 1020d, which may include master control card 230, may update database card 250 anytime a change occurs in a database associated with control plane processing. If card 1020d stops functioning, card 1020e, which may include backup control card 240, may take over as the master of the system and may initiate communication with database card 250 to maintain functioning of the system.

Figure 11:
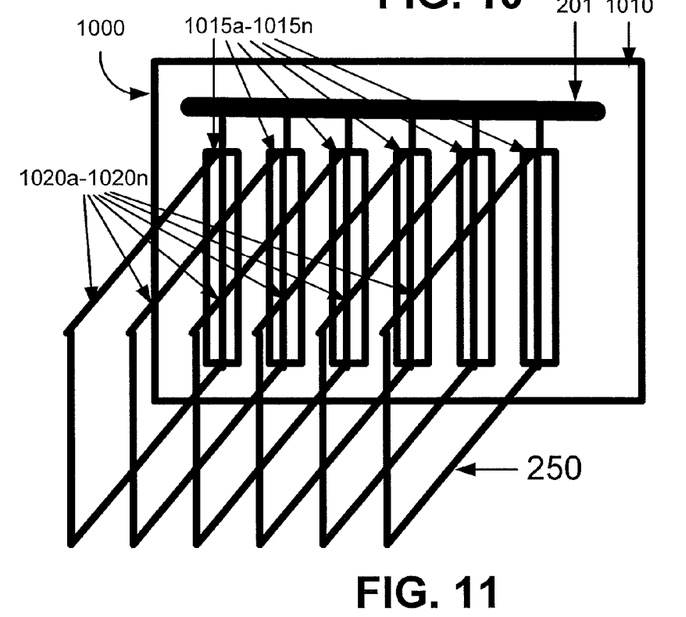
FIG. 11 is a diagram of a second exemplary implementation of a database card implemented in an exemplary chassis network element.

FIG. 11 is a diagram of a second exemplary implementation of a database card implemented in an exemplary chassis network element. In the exemplary implementation of FIG. 11, instead of a database card being included in the backplane, a database card is provided as one of the cards. Thus, database card 250 may not be part of backplane 1010. Rather, database card 250 may be one of cards 1020a-1020n, such as card 1020f. Card 1020d, which may include master control card 230, may update card 1020f, which may include database card 250, anytime a change occurs in a database associated with control plane processing. If card 1020d stops functioning, card 1020e, which may include backup control card 240, may take over as the master of the system and may initiate communication with card 1020f to maintain functioning of the system.

Although FIG. 10 and FIG. 11 show exemplary components of chassis network element 1000, in other embodiments, chassis network element 1000 may include fewer, different, or additional components than depicted in FIG. 10 and FIG. 11. In still other embodiments, one or more components of chassis network element 1000 may perform the tasks described as being performed by one or more other components of chassis network element 1000.

CONCLUSION

Implementations described here may provide a network element with separate control plane processing and database maintenance. Each control card that may become a master control card of the network element has a processor and a memory for control plane processing. All control cards are connected to a database maintenance card, which has its own processor and memory. The master control card processes all control plane messages and the database maintenance card maintains all the databases associated with control plane processing. The processor of the master control card sends messages to the processor of the database maintenance card to query, store, or delete information in the databases of the database maintenance card, which are shared by all the control cards in the network element.

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with respect to FIGS. 5-7, the order of the blocks may be modified in other implementations. Further, non-dependent blocks may be performed in parallel.

Still further, aspects have been mainly described in the context of a network element, such as a router, switch, gateway, or a firewall. As discussed above, the device and methods described herein may be used with any type of network device that communicates with other devices in a communications network.

It will be apparent that aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

It should be emphasized that the term "comprises/comprising" when used in this specification is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed:

1. A system comprising:
a backplane including:
a storage component;
a plurality of physical slots that accommodate cards; and
a bus connected to the storage component and the cards,
the cards including:
a first card, and
a second card,
the storage component being located separately from the plurality of physical slots,
the second card being to:
determine that the first card is not functioning, and
initiate, based on determining that the first card is not functioning, communication with the storage component via the bus to maintain functioning of the system, and
the storage component being to:
identify, after the second card initiates the communication with the storage component, a particular record, of a plurality of records of the storage component, that will be read by the second card,
the particular record including information regarding a type of interface that a physical interface card (PIC) terminates, and
the particular record being read by the second card when a user enters, via a console port, a command to show hardware present in the system, and
lock the particular record to prevent the first card or another component from manipulating the particular record.

2. The system of claim 1, where the first card performs control plane processing.

3. The system of claim 1, where the first card is to:
receive a control packet from a source device, and
update a routing table based on the control packet.

4. The system of claim 1, where the storage component is to:
store information used by the first card or the second card to perform control plane processing.

5. The system of claim 4, where the information associated with the control plane processing includes information associated with one or more network protocols that are implemented by the system.

6. The system of claim 1, where the PIC includes ports.

7. The system of claim 6, where a port, of the ports, is programmed and formatted according to a synchronous optical network (SONET) standard.

8. The system of claim 1, where the second card is further to:
receive particular information from the storage component, and
perform control plane processing based on the particular information.

9. The system of claim 8, where, when performing the control plane processing, the second card is to:

determine that a particular control packet is not received from a source device, and designate the source device as being out of service based on the particular control packet not being received from the source device.

10. The system of claim 1, further comprising:
receive a signal indicating that the first card is not performing particular processing,
where, when determining that the first card is not functioning, the second card is to:
determine that the first card is not functioning based on the signal.

11. A non-transitory computer-readable medium storing instructions, the instructions comprising:
one or more instructions that, when executed by a first card connected to a backplane in a system, cause the first card to:
determine that a second card, connected to the backplane, is not functioning,
the backplane including:
a storage component, and
a plurality of physical slots that accommodate cards, the cards including the first card and the second card, and
the storage component being located separately from the plurality of physical slots; and
initiate, based on determining that the second card is not functioning, communication with the storage component to maintain functioning previously performed by the second card,
a particular record, of a plurality of records of the storage component, that will be read being identified and locked based on the first card initiating the communication with the storage component,
the particular record being read by the second card when a user enters, via a console port, a command to show hardware present in the system,
the particular record including information associated with a type of interface that a physical interface card (PIC) terminates, and
the particular record being locked preventing the second card or another component from accessing the particular record.

12. The non-transitory computer-readable medium of claim 11, where the backplane further includes a bus that connects the storage component and the cards.

13. The non-transitory computer-readable medium of claim 11, where the one or more instructions to initiate the communication with the storage component comprise:
one or more instructions that, when executed by the first card, cause the first card to:
initiate the communication with the storage component via a bus connected to the first card and the storage component.

14. The non-transitory computer-readable medium of claim 11, where the instructions further comprise:

one or more instructions that, when executed by the first card, cause the first card to:
receive particular information from the storage component, and
perform control plane processing based on the particular information.

15. The non-transitory computer-readable medium of claim 14,
where the particular information includes information regarding timers that are associated with one or more network protocols, and
where the timers include a timer that indicates a lifetime of a control packet.

16. The non-transitory computer-readable medium of claim 11,
where the instructions further comprise:
one or more instructions that, when executed by the first card, cause the first card to:
receive a signal indicating that the second card is not performing control plane processing, and
where the one or more instructions to determine that the second card is not functioning comprise:
one or more instructions that, when executed by the first card, cause the first card to:
determine that the second card is not functioning based on the signal.

17. A system comprising:
a backplane,
the backplane including:
a storage component, and
a plurality of physical slots that accommodate cards,
the cards including a first card and a second card,
the storage component being located separately from the plurality of physical slots, and
the storage component being to:
identify, after the second card initiates a communication with the storage component, a particular record, of a plurality of records of the storage component, that will be read by the second card,
the particular record including information associated with atype of interface that a physical interface card (PIC) terminates,
the particular record being read by the second card when a user enters, via a console port, a command to show hardware present in the system, and
lock the particular record to prevent the first card or another component from manipulating the particular record.

18. The system of claim 17, where the PIC includes ports.

19. The system of claim 17, where the backplane further includes a bus that connects the storage component and the cards.

20. The system of claim 17, where the command includes a GET command.

* * * * *